UNITED STATES PATENT OFFICE.

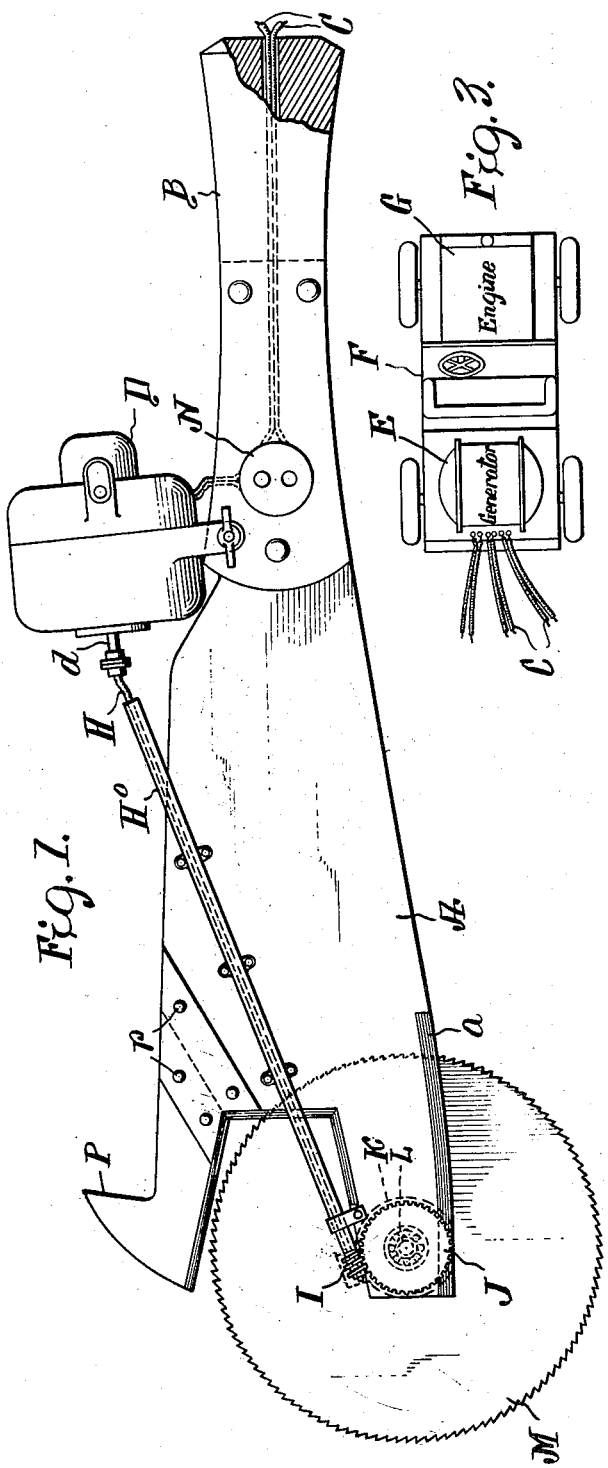
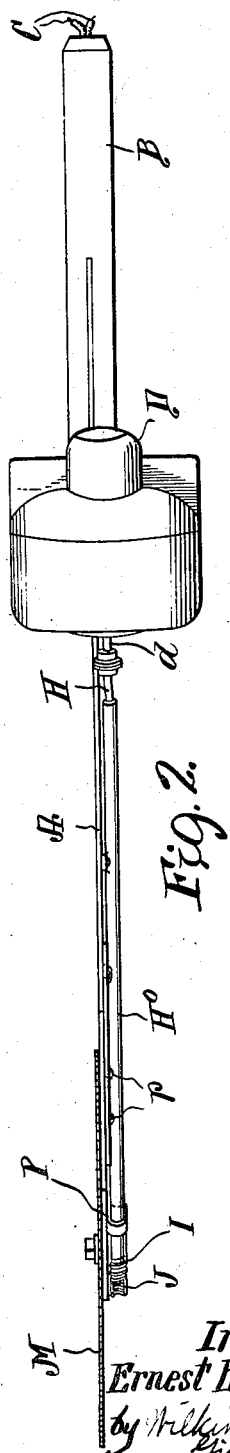

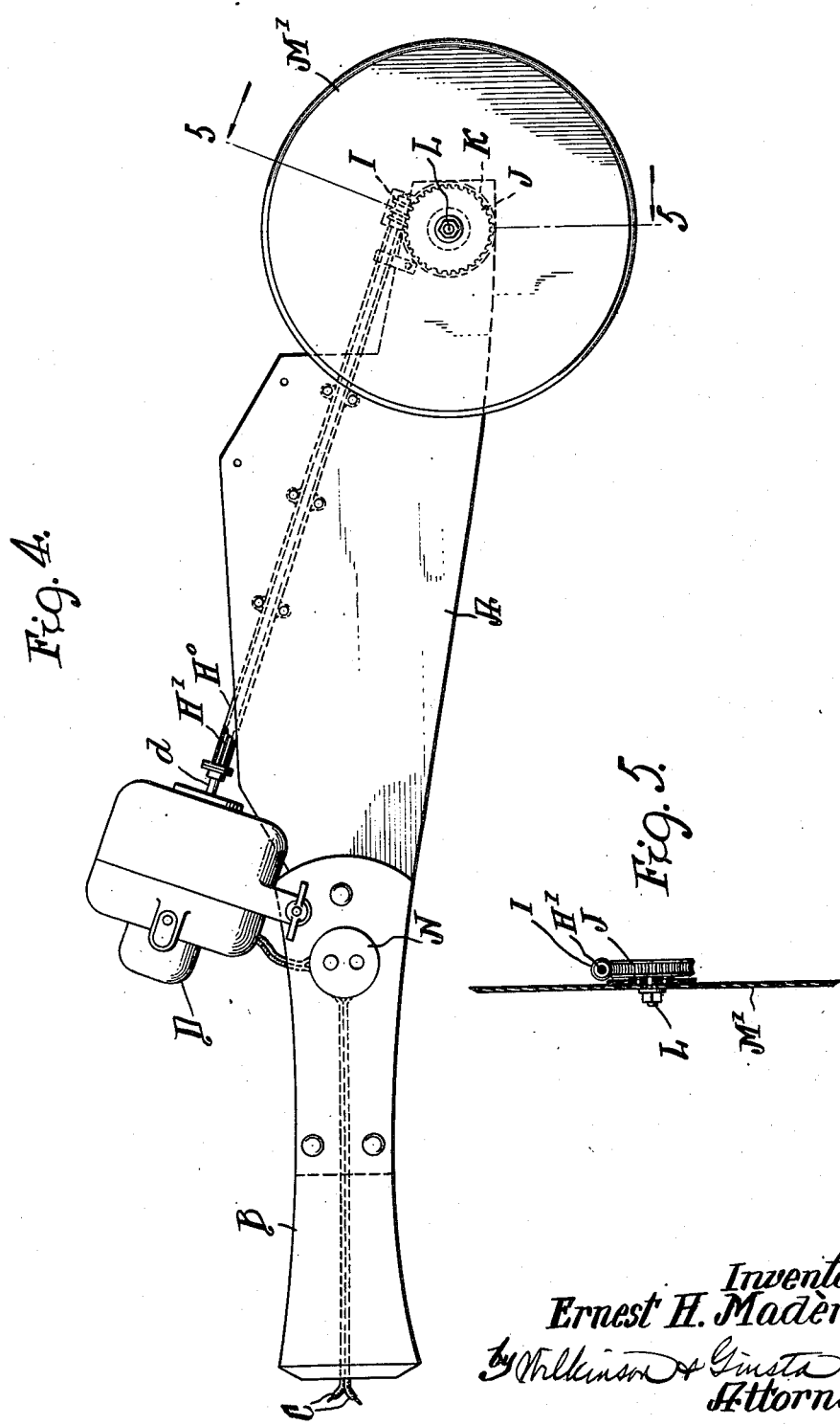

ERNEST HUBERT MADÈRE, OF HAHNVILLE, LOUISIANA.

HAND-CONTROLLED ROTARY CUTTING IMPLEMENT.

1,342,294.  Specification of Letters Patent.  Patented June 1, 1920.

Application filed July 24, 1919. Serial No. 313,088.

*To all whom it may concern:*

Be it known that I, ERNEST HUBERT MADÈRE, a citizen of the United States, residing at Hahnville, in the parish of St. Charles and State of Louisiana, have invented certain new and useful Improvements in Hand-Controlled Rotary Cutting Implements; and I do hereby declare the following to be a full, clear, and exact description of the invention, such as will enable others skilled in the art to which it appertains to make and use the same.

My invention relates to electrically operated hand-controlled rotary cutters, primarily intended for agricultural purposes, but applicable for use in other relations. The invention is especially designed and adapted for use in cutting sugar cane, but it may also be used for cutting corn or other like crops, or for pruning trees, trimming hedges or other gardening purposes, and also for use in butcher shops where it is desired to slice meat, saw bones, or the like.

The invention, in fact, is capable of a great variety of uses, a few of which are set out in the accompanying specification.

The invention will be particularly described as applied to the cutting of sugar cane, for which it is especially intended and eminently adapted.

Sugar cane is a large species of grass having a hard bark or rind containing more or less silica, and especially in the tropics the individual stalks of cane grow to a large size and it requires considerable manual power to cut the same even with a sharp knife. The difficulty of cutting the cane becomes greater in dry seasons when the cane becomes tough and hard, and my invention is intended to provide a hand-controlled power apparatus by means of which the cane may be readily and quickly cut without the waste of so much muscular energy as is ordinarily required in the operation of cutting the same.

My invention will be more fully understood after reference to the accompanying drawings in which similar parts are indicated by similar reference symbols in the several views, and in which:

Figure 1 is a side elevation of a cane cutting knife fitted with a rotary cutter according to my invention, parts being broken away.

Fig. 2 is a plan view of the device shown in Fig. 1.

Fig. 3 is a diagram on a smaller scale, showing the portable source of electric energy used in connection with a number of rotary cutters.

Fig. 4 is a side elevation of a modification used for pruning purposes or for cutting meat or the like; and Fig. 5 shows a section along the line 5—5 of Fig. 4, and looking in the direction of the arrows.

Referring first to Figs. 1 to 3, A represents a blade which is preferably provided with a cutting edge $a$ near its forward end but adjacent to the rotary cutter. This blade is provided with a handle B through which passes the conducting wires C leading to the electric motor D, which receives its electricity from any suitable source of power, preferably the generator E carried by the motor wagon F whose engine C drives the generator; and this generator is connected to a group of rotary cutters each of which is controlled by a laborer, not shown.

The electric motor D is secured to the handle B preferably close to the grip thereof, and its armature shaft $d$ is connected by a flexible shaft H in the tubular casing $H^0$ to the worm I meshing with a worm wheel J carried by the shaft L on which the rotary cutter M is mounted. The gearing is preferably inclosed in a casing K indicated in dotted lines in Figs. 1 and 4.

The electric motor may be started or stopped by means of any suitable switch arrangement N carried by the handle B.

In the operation of cutting cane it is generally desirable to strip the dead leaves from the stalks before cutting the tops or the bottoms of the stalks, and for this purpose I provide a hook P which may be attached to the blade A in any convenient way, as by the bolts or rivets $p$. In using this hook the knife is turned through 180°, and the back of the blade is used to knock off trash and the hook is used to clear up the same; moreover, the hook may be used to lift up bent down stalks or to clear out trash or weeds, as these occur in standing cane.

In practice, a gang of cane cutters would each be provided with one of the hand controlled rotary cutters herein described, and these would be followed by a motor car, or other vehicle supplying the electricity which may be generated by means of a dynamo driven by an ordinary internal combustion engine; but where a fixed source of electricity is available, it will be obvious that a long cable may be used with branches leading to the various operators.

In cutting cane with the device shown in Figs. 1 and 2, the trash would be removed by two downward strokes back of the knife, one on each side of the stalk, and then turning the knife through 90° the rotary cutter is applied to the cane near the top, cutting off the top thereof, and then it is applied to the bottom of the stalk near the ground, cutting the cane at the bottom; at the same time the stalk is directed by the free hand of the operator into the heap-row.

It will be noted the inertia due to the weight of the motor and attached parts, would tend to steady the knife which will, of course, be supplemented by the hand pressure of the operator, and the stalks are quickly cut top and bottom by the rapid rotation of the rotary cutter M.

The cutting blades may be made interchangeable so that when one gets dulled a fresh one may be supplied; and moreover blades having teeth of various size or pitch may be used, where the general type of the cane is hard or soft.

It will be noted that the device shown in Figs. 1 and 2 is especially adapted for pruning trees, hedges, or the like, where the hook may be used to pull down the branch of the tree, the free end of which branch may be grasped by the free hand of the operator as it is sawed off by the cutting tool.

Where it is desired to cut softer material, such as potato or tomato vines, meat or the like, the blade may be used without teeth, such as shown at M' in Figs. 3 and 4. In these figures I have shown the hook of Figs. 1 and 2 omitted, but it may be added if desired.

In these two figures I have also shown the shaft H' leading from the motor or rigid shaft instead of the flexible shaft shown in the former figures. In this construction the device may be used from the stationary electric plant, but the general operation of the device is the same in both cases.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:

1. An electrically operated hand controlled rotary cutting implement comprising a stripping blade, a rotary cutter journaled on said blade near the forward end thereof, a handle at the rear end of said blade, an electric motor mounted on said handle, means operated by the armature shaft of said motor for driving said rotary cutter, and means for supplying said motor with electrical energy, substantially as described.

2. An electrically operated hand controlled rotary cutting implement comprising a stripping blade, a rotary cutter journaled on said blade near the forward end thereof, a handle at the rear end of said blade, an electric motor mounted on said handle, a shaft connected to the armature shaft of said motor, and gearing driven by said first-mentioned shaft for driving said rotary cutter, and means for supplying said motor with electrical energy, substantially as described.

3. An electrically operated hand controlled rotary cutting implement comprising a stripping blade, a rotary cutter journaled on said blade near the forward end thereof, a handle at the rear end of said blade, an electric motor and a switch for controlling same mounted near the front end of said handle, means operated by the armature shaft of said motor for driving said rotary cutter, leading in wires passing through said handle and connected to said motor, and means for supplying said motor with electrical energy, substantially as described.

4. An electrically operated hand controlled rotary cutting implement comprising a stripping blade, a rotary cutter journaled on said blade near the forward end thereof, a handle near the rear end of said blade, an electric motor and a switch for controlling same mounted on said handle near the front end thereof, a shaft connected to the armature shaft of said motor, worm gearing connecting said first-mentioned shaft with the cutter shaft for driving said rotary cutter, leading in wires passing through said handle and connected to said motor, and means for supplying said motor with electrical energy, substantially as described.

5. An electrically operated hand controlled rotary cutting implement comprising a stripping blade having a hook at the front end of the back thereof, a rotary cutter journaled on said blade near the forward end thereof, a handle at the rear end of said blade, an electric motor mounted on said handle near the front end thereof, a shaft connected to the armature shaft of said motor, gearing driven by said first-mentioned shaft for driving said rotary cutter, and means for supplying said motor with electrical energy, substantially as described.

6. An electrically operated hand controlled rotary cutting implement comprising a stripping blade having a hook at the front end of the back thereof, a rotary cutter journaled on said blade near the forward end thereof, a handle at the rear end of said blade, an electric motor and a switch for controlling same mounted on said handle near the front end thereof, means operated by the armature shaft of said motor for driving said rotary cutter, and means for supplying said motor with electrical energy, substantially as described.

7. An electrically operated hand controlled rotary cutting implement comprising a stripping blade having a hook at the front end of the back thereof, a rotary cutter journaled on said blade near the forward end thereof, a handle at the rear end of said blade, an electric motor and a switch for controlling same mounted on said handle near the forward end thereof, a shaft connected to the armature shaft of said motor, worm gearing connecting said first-mentioned shaft with the cutter shaft for driving said rotary cutter, and means for supplying said motor with electrical energy, substantially as described.

ERNEST HUBERT MADÈRE.